United States Patent
Gupta et al.

(10) Patent No.: US 11,064,022 B2
(45) Date of Patent: Jul. 13, 2021

(54) MESSAGING SYSTEM FAILOVER

(71) Applicant: Verizon Patent and Licensing Inc., Arlington, VA (US)

(72) Inventors: Amit Gupta, Cumming, GA (US); Sarvesh Agrawal, Atlanta, GA (US); Vijaya Kosuri, Atlanta, GA (US); Pramod Kalyanasundaram, Acton, MA (US); Lakshmi Chakarapani, Sandy Springs, GA (US); Srinivas S. Halembar, Alpharetta, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 124 days.

(21) Appl. No.: 16/260,954

(22) Filed: Jan. 29, 2019

(65) Prior Publication Data
US 2020/0244726 A1    Jul. 30, 2020

(51) Int. Cl.
*H04L 29/08* (2006.01)
*H04L 12/24* (2006.01)
*H04L 12/863* (2013.01)
*H04L 12/851* (2013.01)

(52) U.S. Cl.
CPC ...... *H04L 67/1034* (2013.01); *H04L 41/0668* (2013.01); *H04L 47/24* (2013.01); *H04L 47/622* (2013.01); *H04L 67/322* (2013.01); *H04L 67/325* (2013.01)

(58) Field of Classification Search
CPC . H04L 67/1034; H04L 47/622; H04L 67/325; H04L 41/0668; H04L 47/24; H04L 67/322
See application file for complete search history.

(56) References Cited

U.S. PATENT DOCUMENTS

| | | | | |
|---|---|---|---|---|
| 2015/0381708 | A1* | 12/2015 | Word | H04L 69/40 709/203 |
| 2017/0116210 | A1* | 4/2017 | Park | G06F 9/542 |
| 2017/0118042 | A1* | 4/2017 | Bhattacharya | H04L 12/4625 |

* cited by examiner

*Primary Examiner* — Bryce P Bonzo
*Assistant Examiner* — Michael Xu

(57) ABSTRACT

A device receives a notification indicating a failure of a first server device responsible for a primary message queue that includes messages at a time of the failure. A second server device is responsible for a standby message queue to which the messages are replicated, where a position in the standby message queue and a message time are assigned to each of the replicated messages. The device obtains a record time that identifies the message time of one of the messages that was last obtained from the primary message queue prior to the failure, compares an adjusted record time and the message time of one or more of the messages of the standby message queue to determine a starting position in the standby message queue, and processes messages obtained from the standby message queue beginning at one of the messages assigned to the position that matches the starting position.

20 Claims, 9 Drawing Sheets

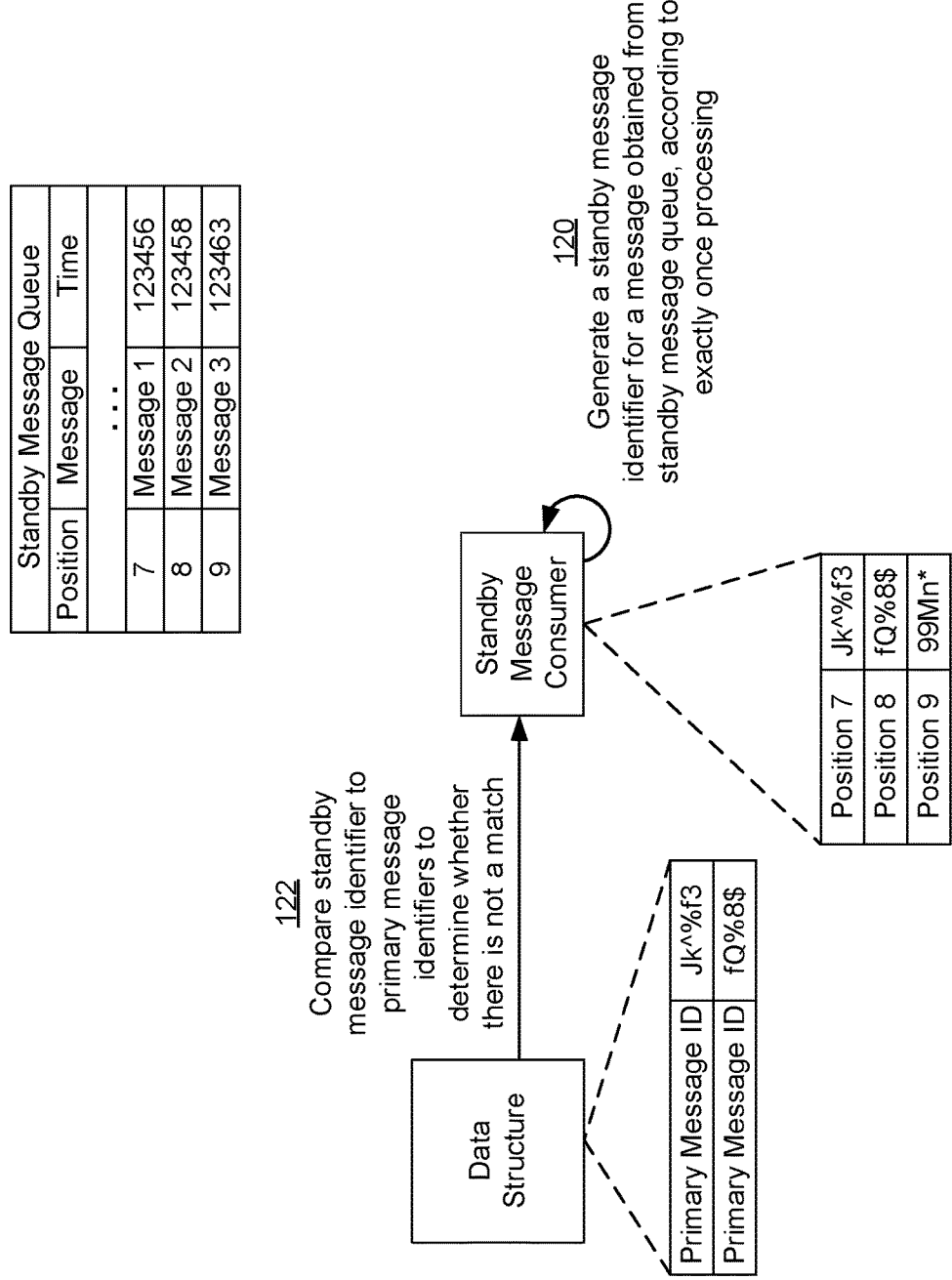

500 ⟶

510 — Receive a notification indicating a failure of one or more first server devices, wherein the one or more first server devices are responsible for a primary message queue, wherein the primary message queue includes a plurality of messages at a time of the failure of the one or more first server devices, wherein a message time is assigned to each of the plurality of messages, wherein the primary message queue is associated with a standby message queue, wherein the plurality of messages is replicated to the standby message queue, wherein one or more second server devices are responsible for the standby message queue, wherein a position in the standby message queue is assigned to each of the plurality of messages replicated to the standby message queue 520 — Obtain a record time, wherein the record time identifies the message time of one of the plurality of messages that was last obtained from the primary message queue prior to the failure of the one or more first server devices 530 — Perform a time adjustment of the record time to obtain an adjusted record time 540 — Compare the adjusted record time and the message time of one or more of the plurality of messages of the standby message queue 550 — Determine a starting position in the standby message queue based on comparing the adjusted record time and the message time of one or more of the plurality of messages 560 — Obtain one or more of the plurality of messages from the standby message queue beginning at one of the plurality of messages assigned to the position that matches the starting position 570 — Process the one or more of the plurality of messages obtained from the standby message queue

FIG. 5

MESSAGING SYSTEM FAILOVER

BACKGROUND

Messaging systems handle the sending of messages between processes, applications, and servers. In a distributed messaging system, messages are queued asynchronously between client applications and the messaging system. A distributed messaging system can be a point-to-point messaging system or a publish-subscribe messaging system.

BRIEF DESCRIPTION OF THE DRAWINGS

FIGS. 1A-1E are diagrams of example implementations described herein.

FIG. 5 is a flow chart of an example process for messaging system failover.

DETAILED DESCRIPTION OF PREFERRED EMBODIMENTS

Figure 1A:
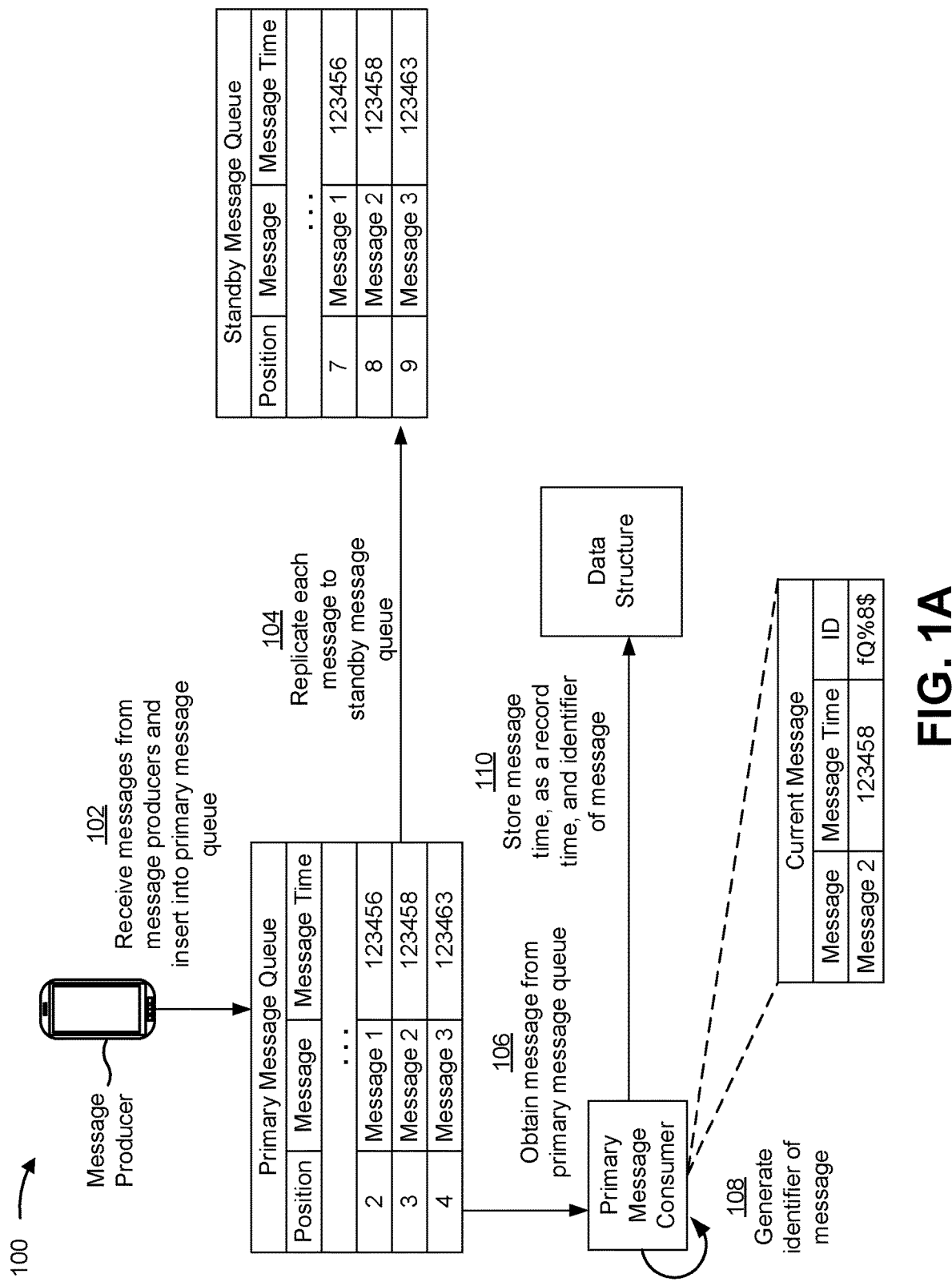

The following detailed description of example implementations refers to the accompanying drawings. The same reference numbers in different drawings can identify the same or similar elements.

Messaging systems can be responsible for brokering millions or billions of messages between applications, processes, or devices. Large volumes of messages can be handled by a messaging system run as multiple server clusters that span multiple data centers in an active-active configuration (e.g., the Apache Kafka messaging platform). In such cases, a load balancer device can distribute incoming messages among the multiple server clusters.

The failure of a data center (e.g., due to natural disaster, hardware failure, power failure, etc.) responsible for a server cluster can disrupt message retrieval from the messaging system. In an active-active data center configuration, upon the failure of one or more data centers, the load balancer device can distribute new incoming messages among the remaining data centers to prevent any disruption to the processing of new incoming messages.

However, older messages associated with the data center in the state of failure that were not processed prior to the failure will be permanently lost or significantly delayed. In some cases, such as where the messages relate to instructions for a telematics device to execute an action (e.g., a telematics device associated with a vehicle), the loss or delay of the messages can result in an action that is not executed (e.g., reporting a traffic accident involving a vehicle) or result in an action being executed multiple times (e.g., transmitting a payment). In this context, an unreliable messaging system can lead to injury, damaged or stolen property, failure of a device, wasted resources associated with detecting, investigating, and/or addressing improperly executed actions, and inefficiencies associated with unreliable communication between message producer devices and telematics devices.

Some implementations described herein include a messaging system, run by multiple devices (e.g., multiple clusters of one or more server devices), that can process messages without loss or significant delay in the event of a failure of one or more devices responsible for the messaging system. The messaging system, described herein, stores incoming messages by a primary message queue associated with one or more devices (e.g., one or more server devices associated with a first data center) and replicates the messages to a standby message queue associated with one or more other devices (e.g., one or more server devices associated with a second data center). In the event of a failure of the one or more devices associated with the primary message queue, a standby message consumer associated with the standby message queue can resume processing messages in the standby message queue from a particular starting position to avoid lost or delayed messages.

In this way, messages stored by the message queue associated with one or more devices in a state of failure are not lost or delayed, thereby improving the reliability and performance of the messaging system and the reliability of communications between message producer devices (e.g., user devices that transmit messages) and telematics devices (e.g., telematics devices associated with vehicles that execute actions based on the messages). In addition, the reliable processing of messages by the present messaging system conserves computing resources (e.g., processing resources, memory resources, and/or the like) and/or network resources that would otherwise be wasted in retransmitting and requeuing messages that are lost or delayed due to a server failure.

FIGS. 1A-1E are diagrams of one or more example implementations 100 described herein. As shown in FIGS. 1A-1E, example implementation(s) 100 can include a messaging system that receives messages (e.g., requests to perform an action) transmitted by one or more message producers (e.g., user devices) that are intended for one or more devices (e.g., telematics devices associated with vehicles). The messaging system can include a primary message queue associated with one or more server devices (e.g., one or more server devices associated with a data center of a first geographical region) and a standby message queue associated with one or more server devices (e.g., one or more server devices associated with a data center of a second geographical region). A primary message consumer associated with one or more server devices (e.g., the one or more server devices associated with the primary message queue or one or more different server devices) can obtain messages from the primary message queue and prepare the messages for transmission to a device. A standby message consumer associated with one or more server devices (e.g., the one or more server devices associated with the standby message queue or one or more different server devices) can obtain messages from the standby message queue and prepare the messages for transmission to a device in the event of a failure of the one or more server devices associated with the primary message queue. Data about messages processed by the primary message consumer can be stored in a data structure (e.g., a database, a linked list, a table, and/or the like) that is accessible to the standby message consumer.

In some implementations, the primary message queue is responsible for storing messages relating to one category of message (e.g., messages relating to an action of one particular type, such as starting an engine of a vehicle) that are transmitted by one or more message producers (e.g., user devices, such as smartphones, tablet computers, laptop computers, desktop computers, key fobs, and/or the like, server devices associated with a telematics service provider, telematics devices, and/or the like). The messages stored by the primary message queue can be obtained by the primary message consumer and prepared for transmission to a telematics device (e.g., a vehicle "black box" device, a vehicle on-board diagnostic device, a vehicle original equipment manufacturer (OEM) device, a vehicle electronic control module (ECM), and/or the like) or another device (e.g., a user device, such as a smartphone, a tablet computer, etc., a device associated with an emergency dispatcher, a device associated with a vehicle manufacturer, a device associated with a customer support center, and/or the like).

In some implementations, the primary message queue is associated with the standby message queue, such that messages received by the primary message queue are replicated in the standby message queue. In the event of a failure of the one or more devices responsible for the primary message queue, a standby message consumer can obtain and process one or more messages from the standby message queue according to whether the category of the messages in the primary message queue and the standby message queue relate to a type of action that is to be executed at most once, a type of action that is to be executed at least once, or a type of action that is to be executed exactly once.

In some implementations, the messaging system described herein can be run as multiple server clusters that span multiple data centers in an active-active configuration. For example, a first primary message queue can be operated by a first server cluster of a first data center and a second primary message queue can be operated by a second server cluster of a second data center, with incoming messages being distributed between the first primary message queue and the second primary message queue by a load balancer device. Continuing with the previous example, the first primary message queue can be associated with a first standby message queue operated from the second data center and the second primary message queue can be associated with a second standby message queue operated from the first data center. In this way, the primary message queues are operated from different data centers than their respective standby message queues, thereby improving the reliability of the messaging system in the event of a failure of a data center operating one of the primary message queues.

In some implementations, the messaging system can be associated with an organization that provides telematics services for vehicles (e.g., a vehicle manufacturer). While the description to follow will be described in terms of an example of a messaging system that receives messages that request an action from a telematics device of a vehicle, the description is not limited to this particular example. Implementations described herein also apply to other organizations that employ messaging systems to communicate messages between applications or devices in connection with other types of services.

As shown in FIG. 1A, and by reference number 102, one or more message producers can transmit messages to the messaging system where the messages are inserted into the primary message queue. In some implementations, the message producer can be a user device (e.g., a smartphone, a tablet computer, a laptop computer, a desktop computer, a key fob, and/or the like), a server device associated with a telematics service provider (e.g., a vehicle manufacturer), or a telematics device (e.g., a telematics device of a vehicle). In some implementations, the message producer can be configured to be associated with a particular telematics device of a vehicle. For example, a user device of a user can include an interface that provides mechanical or digital buttons that are associated with actions that are assigned to the telematics device of the user's vehicle (e.g., start the engine of the user's vehicle, unlock the doors of the user's vehicle, etc.).

Continuing with the previous example, the user device can create a message, based on a command provided by the user, that includes an action type and/or an identifier (e.g., an identification string) of the telematics device (e.g., "unlock doors/device 12345"). In some implementations, the message transmitted by the message producer also can be associated with a transmission time (e.g., timestamp) from the message producer.

The messaging system can insert messages into the primary message queue according to the order that the messages are received by the messaging system. In some implementations, the primary message queue is a commit log that can store messages in key/value pairs (e.g., the key representing an offset of the message and the value representing the content of the message) together with a message time (e.g., the transmission time from the message producer). For example, as messages are inserted into the primary message queue, the primary message queue can assign a message a position (e.g., a numeric offset) in the primary message queue relative to the first entry of the primary message queue and a transmission time (e.g., a timestamp of when the message was transmitted from the message producer) and/or an insertion time (e.g., a timestamp of when the message was inserted into the primary message queue). In this way, the primary message queue maintains a chronological log of incoming messages so that the primary message consumer can obtain the messages from the primary message queue in chronological order.

In some implementations, the primary message queue relates to one category of message (e.g., messages that all request an action of the same type). For example, the primary message queue can store messages that all request starting an engine of a vehicle.

In some implementations, the messaging system can employ one or more additional message queues that serve the same function as the primary message queue in connection with additional categories of messages. For example, one message queue can store messages that relate to an action of a first type (e.g., unlocking the doors of a vehicle), and another message queue can store messages that relate to an action of a second type (e.g., reporting a traffic accident involving a vehicle). Accordingly, in some implementations, a message can be designated for a message queue of a particular category of action and contain an identifier of a telematics device that is to perform the action. In this way, the size of a message can be reduced, thereby conserving computing resources (e.g., processing resources, memory resources, and/or the like) associated with storing and processing the messages, and conserving network resources associated with transmitting the messages.

In some implementations, a message queue can be partitioned into multiple message queue partitions to permit parallel processing of the messages by multiple message consumers. For example, messages received by the messaging system that relate to a particular message category (e.g., unlocking the doors of a vehicle) can be stored to multiple message queue partitions associated with the category in a round-robin fashion. In such implementations, the primary message queue described herein can refer to a message queue partition.

As shown by reference number 104, the messaging system can transmit, or cause to be transmitted, a message that is stored in, or intended for, the primary message queue to the standby message queue, such that the message is replicated and inserted into the standby message queue. The standby message queue can be structured to insert messages in a similar manner as described above for the primary message queue. In addition, the standby message queue can relate to one category and/or partition in a similar manner as described above for the primary message queue.

In some implementations the messages and associated data are identical in the primary message queue and the standby message queue. However, the position (e.g., numeric offset) of a message relative to a first entry of the primary message queue can be different from the position of a message relative to a first entry of the standby message queue (e.g., due to the standby message queue being implemented at a later time than the primary message queue and/or due to differences in transmission speed of messages and/or insertion speed of messages between the primary message queue and the standby message queue). Accordingly, the messaging system described herein enables the correlation between a message in the primary message queue and the standby message queue even where the positions of the message of the primary message queue and the standby message queue, respectively, are different. In this way, unprocessed messages in the primary message queue after a failure of the one or more devices responsible for the primary message queue can be processed from the standby message queue, thereby improving the reliability and performance of the messaging system.

In some implementations, the standby message queue is associated with a data center in a different geographical region from the data center associated with the primary message queue. In this way, a failure of the data center that is responsible for the primary message queue will not affect the availability of the standby message queue, thereby further improving the reliability of the messaging system described herein.

As shown by reference number 106, the primary message queue is associated with a primary message consumer that obtains messages from the primary message queue for processing. The primary message consumer can obtain messages from the primary message queue in chronological order and prepare the messages for transmission to a telematics device or another device.

In some implementations, the primary message consumer can be one of several message consumers of a group of message consumers. A message consumer of the group can be assigned to obtain messages from a respective message category and/or from a respective message queue or message queue partition, as described above. For example, the primary message consumer can be assigned to obtain messages from the primary message queue partition.

As shown by reference number 108, the primary message consumer can assemble data relating to a message that is obtained from the primary message queue. For example, the primary message consumer can record a record time for a message obtained from the primary message queue (e.g., a timestamp of a time of transmission of the message by a user device and/or a time of insertion of the message into the primary message queue) and generate a primary message identifier for the message (e.g., a hash value that uniquely identifies the message).

In some implementations, as a message is obtained from the primary message queue by the primary message consumer, the record time is initialized, or updated, to reflect the message time of the message that was obtained from the primary message queue. For example, the record time can be initialized to the message time of a first message obtained from the primary message queue, and the record time can be updated to the message time of a second message obtained from the primary message queue. In the event of a failure of the one or more devices associated with the primary message queue, the record time is the message time of a message that was last obtained from the primary message queue prior to the failure. In this way, the record time can be used to efficiently identify messages in the standby message queue that were inserted after the time that a message was last obtained from the primary message queue prior to the failure, thereby conserving computing resources and/or network resources that would otherwise be wasted recording and comparing multiple data for every message obtained from the primary message queue.

The primary message identifier is a unique identifier for a message that is obtained from the primary message queue. In some implementations, the primary message identifier can be generated from data associated with the message, such as the content of the message, a timestamp (e.g., the message time of the message, such as a time of transmission of the message by a user device and/or a time of insertion of the message into the primary message queue), and/or metadata (e.g., the message category associated with the message, the message queue partition associated with the message, and/or the like). For example, the primary message identifier can be a hash value of the content of the message and the time of transmission of the message by a message producer.

In the event of failure of the one or more devices responsible for the primary message queue, the record time and primary message identifiers provide records of the messages that were obtained by the primary message consumer prior to the failure. In this way, the last message that was processed by the primary message consumer prior to the failure can be determined, and message retrieval can resume without loss or significant delay, thereby improving the reliability of the messaging system.

As shown by reference number 110, the primary message consumer can access a data structure (e.g., a database, a linked list, a table, and/or the like). In some implementations, the primary message consumer causes data relating to the messages obtained from the primary message queue to be stored in the data structure. For example, the primary message consumer can store the record time and primary message identifier of a message to the data structure. In some implementations, data relating to a message obtained from the primary message queue (e.g., a record time and/or one or more primary message identifiers) can be associated in the data structure with a category of messages to which the message relates. Additionally, or alternatively, data relating to a message obtained from the primary message queue (e.g., a record time and/or one or more primary message identifiers) can be associated in the data structure with a message queue partition (e.g., the primary message queue partition) to which the message relates.

The data structure can be associated with one or more devices (e.g., server devices) that can communicate with, and are accessible to, the one or more devices associated with the primary message consumer and the one or more devices associated with the standby message consumer. In this way, data relating to the messages processed by the primary message consumer can be communicated to the standby message consumer in the event of failure of the one or more devices associated with the primary message queue.

In some implementations, the standby message consumer can perform one or more operations on the data in the data structure to determine a message from which to resume message retrieval. As described below, the particular processing performed by the standby message consumer is based on the category of the messages in the primary message queue and the standby message queue.

For example, if the category of the messages of the primary message queue and the standby message queue relates to an action of a type that is to be executed at most once, such that not executing the action is acceptable (e.g., providing a speeding alert to a vehicle), the messages of the standby message queue can be processed by the standby message consumer as described below in connection with FIGS. 1B and 1E (referred to herein as at most once processing). Alternatively, if the category of the messages of the primary message queue and the standby message queue relates to an action of a type that is to be executed at least once, such that duplicate execution of the action is acceptable (e.g., transmitting a maintenance notification for a vehicle), the messages of the standby message queue can be processed by the standby message consumer as described below in connection with FIGS. 1C and 1E (referred to herein as at least once processing). Alternatively, if the category of the messages of the primary message queue and the standby message queue relates to an action of a type that must be performed exactly once (e.g., reporting a traffic accident involving a vehicle), the messages of the standby message queue can be processed by the standby message consumer as described below in connection with FIGS. 1C-1E (referred to herein as exactly once processing).

Figure 1B:
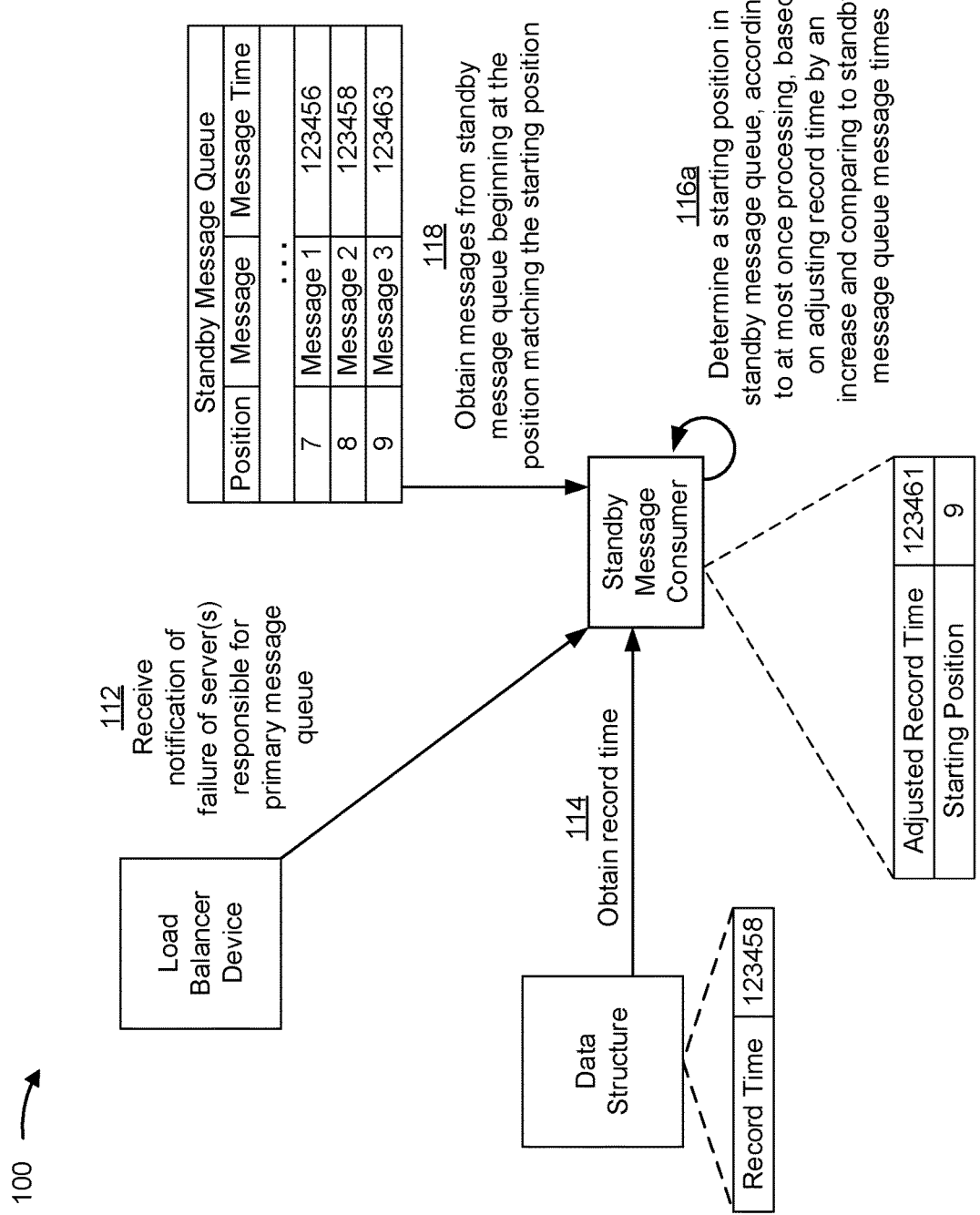

As shown in FIG. 1B, and by reference number 112, according to at most once processing, upon a failure of the one or more devices responsible for the primary message queue, the one or more devices associated with the standby message queue can receive a notification of the failure. In some implementations, a load balancer device (e.g., a load balancer device responsible for distributing incoming messages between multiple primary message queues) can provide the notification of the failure. In some implementations, a device (e.g., a load balancer device or another device) can perform a health check on the one or more devices responsible for the primary message queue (e.g., periodically, according to a schedule, in connection with transmitting messages to the one or more devices, and/or the like). For example, the health check can detect if the one or more devices responsible for the primary message queue are in a state of failure and set a switchover flag that provides notification to the standby message consumer when the health check results in determining that the one or more devices responsible for the primary message queue are in a state of failure. The standby message consumer can initiate retrieval of the messages that were not processed from the primary message queue after receiving the notification of the failure of the one or more devices responsible for the primary message queue. In some implementations, a time from when the standby message consumer receives the notification to a time when the standby message consumer begins processing messages in the standby message queue is less than 10 seconds, less than 5 seconds, less than 0.5 seconds, and/or the like.

As shown by reference number 114, the standby message consumer can obtain the record time from the data structure after receiving the notification of the failure of the one or more devices responsible for the primary message queue. In some implementations, the record time reflects the message time of the last message that was processed from the primary message queue prior to the failure of the one or more devices responsible for the primary message queue.

As shown by reference number 116a, the standby message consumer can perform a time adjustment of the record time to obtain an adjusted record time. In some implementations, a type and/or amount of time adjustment of the record time is based on whether the particular category of the messages in the primary message queue and the standby message queue is associated with at most once processing, at least once processing, or exactly once processing. For example, if the category of the messages in the primary message queue and the standby message queue is associated with at least once processing or exactly once processing, the type of time adjustment can be a decrease. As an additional example, if the category of the messages in the primary message queue and the standby message queue is associated with at most once processing, the type of time adjustment can be an increase. In this way, different categories of messages can be assigned different types and/or amounts of time adjustment according to the type of action associated with the messages in the category.

In some implementations, the type and/or amount of time adjustment associated with a particular category of messages is stored in the data structure. In some implementations, the standby message consumer can obtain the type and/or amount of time adjustment to use from the data structure after receiving the notification of the failure of the one or more devices associated with the primary message queue.

In some implementations, the amount of time by which the record time is adjusted can be a time selected by an administrator of the messaging system or a time generated by the standby message consumer. Additionally, or alternatively, the amount of time by which the record time is adjusted can relate to a lag time (e.g., 1 second, 2 seconds, 5 seconds, etc.) associated with the messaging system. In some implementations, the lag time can be calculated as a difference between a time when a message is inserted into the primary message queue and a time when the message is obtained from the primary message queue by the primary message consumer. In some implementations, the lag time is calculated (e.g., as an average) from historical lag time data recorded prior to the failure of the one or more devices responsible for the primary message queue.

In some implementations, as shown by reference number 116a, the type of adjustment to the record time can be an increase in time. For example, the standby message consumer can adjust the record time by increasing the record time when the category of the messages in the primary message queue and the standby message queue is associated with at most once processing (e.g., providing a speeding notification to a vehicle).

In some implementations, the standby message consumer can determine a starting position in the standby message queue from which to resume retrieving messages by comparing the adjusted record time and the message times associated with the messages in the standby message queue (e.g., timestamps of the time of transmission by a message producer and/or timestamps of the time of insertion into the standby message queue). For example, the starting position in the standby message queue can be a position associated with an oldest message in the standby message queue that has an associated message time (e.g., timestamp of the time of transmission by a message producer and/or timestamp of the time of insertion into the standby message queue) that is greater than the adjusted record time.

Adjusting the record time by an increase allows the standby message consumer to determine a starting position in the standby message queue that is associated with a message that is newer than the last message obtained from the primary message queue prior to the failure. In this way, according to at most once processing, the standby message consumer will not obtain messages that were previously processed by the primary message queue, thereby ensuring that the action associated with a message is executed at most one time.

As shown by reference number 118, the standby message consumer can obtain one or more messages from the standby message queue beginning with the message that is assigned the position that matches the starting position determined by the standby message consumer. In some implementations, the standby message consumer can maintain a record of the message position for a message obtained from the standby message queue, which the standby message consumer can use to determine the position of the next message that should be obtained from the standby message queue.

According to at most once processing, the standby message consumer can prepare a message for transmission to a telematics device, or another device, after the message is obtained from the standby message queue. In this way, at most once processing provides an efficient tool to process potentially lost or delayed messages, of a particular category of messages suitable for at most once processing, without expending the computing resources needed to determine exactly which messages of the standby message queue were not processed from the primary message queue.

Figure 1C:
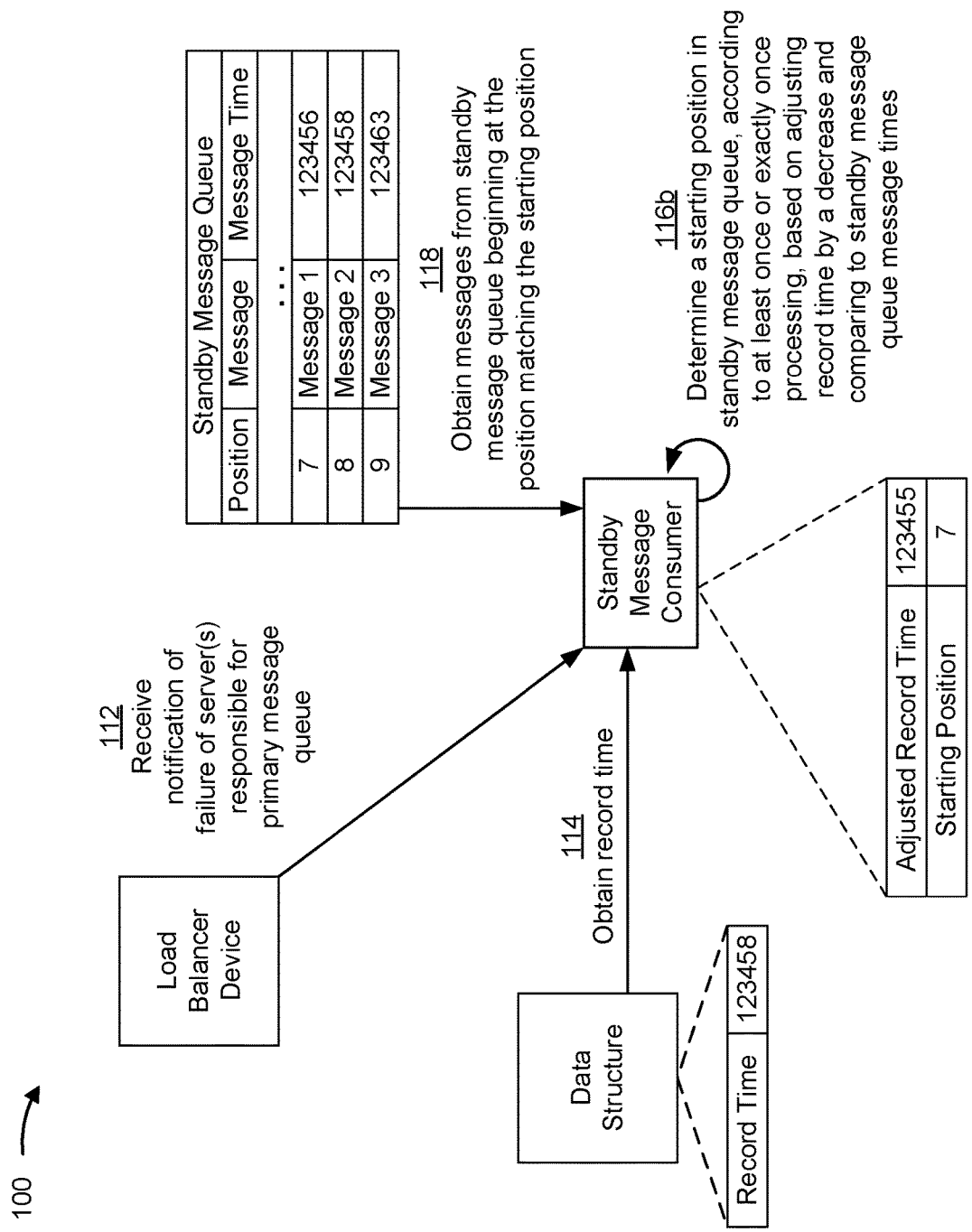

As shown in FIG. 1C, and by reference number 112, according to at least once processing or exactly once processing, the standby message consumer can receive a notification of the failure of the one or more devices associated with the primary message queue in a similar manner as described above in connection with FIG. 1B.

As shown by reference number 114, the standby message consumer can obtain the record time from the data structure after receiving the notification of the failure in a similar manner as described above in connection with FIG. 1B.

As shown by reference number 116b, the standby message consumer can perform a time adjustment of the record time in a similar manner as described above in connection with FIG. 1B. As further shown by reference number 116b, the type of adjustment to the record time can be a decrease in time. For example, the standby message consumer can adjust the record time by decreasing the record time when the category of the messages in the primary message queue and the standby message queue is associated with at least once processing (e.g., transmitting a maintenance notification for a vehicle) or exactly once processing (e.g., reporting a traffic accident involving the vehicle), as described below.

In some implementations, the standby message consumer can determine a starting position in the standby message queue from which to resume retrieving messages in a similar manner as described above in connection with FIG. 1B.

Adjusting the record time by a decrease allows the standby message consumer to determine a starting position in the standby message queue that is associated with a message that is older than the last message obtained from the primary message queue prior to the failure. In this way, the standby message consumer can obtain messages that might have been previously processed by the primary message queue, thereby ensuring that the action associated with a message is executed at least one time or exactly one time, as described below.

As shown by reference number 118, the standby message consumer can obtain and process one or more messages from the standby message queue in a similar manner as described above in connection with FIG. 1B.

According to at least once processing, the standby message consumer can prepare a message for transmission to a telematics device, or another device, after the message is obtained from the standby message queue. In this way, at least once processing provides an efficient tool to process potentially lost or delayed messages, of a particular category of messages suitable for at least once processing, without expending the computing resources needed to determine exactly which messages of the standby message queue were not processed from the primary message queue.

In some implementations, according to exactly once processing, the standby message consumer can perform additional operations, as described below, with one or more messages obtained from the standby message queue to determine a message to prepare for transmission to a telematics device.

As shown in FIG. 1D, and by reference number 120, according to exactly once processing, after obtaining one or more messages from the standby message queue, the standby message consumer can generate standby message identifiers for the one or more messages obtained from the standby message queue. The standby message identifiers can be generated in a similar manner as described above for the primary message identifiers. For example, a standby message identifier can be a hash value of the content of the message and the transmission time of the message by a message producer. In this way, the standby message identifier and the primary message identifier for the same message are identical, thereby providing a basis for comparison that conserves computing resources that would otherwise be wasted by storing and individually comparing all of the data associated with the messages in the primary message queue and the standby message queue.

As shown by reference number 122, the standby message consumer can compare standby message identifiers and primary message identifiers to determine whether there is a match between a standby message identifier and a primary message identifier. For example, the standby message consumer can compare the standby message identifier of a message obtained from the standby message queue and one or more primary message identifiers of the data structure to determine whether there is a match of a standby message identifier and a primary message identifier. A match of a standby message identifier and a primary message identifier indicates that a message in the standby message queue associated with the standby message identifier was processed from the primary message queue. Thus, in some implementations, the standby message consumer can prepare a message for transmission to a telematics device, or another device, based on determining that there is no match of the standby message identifier and a primary message identifier, as described below.

Figure 1E:
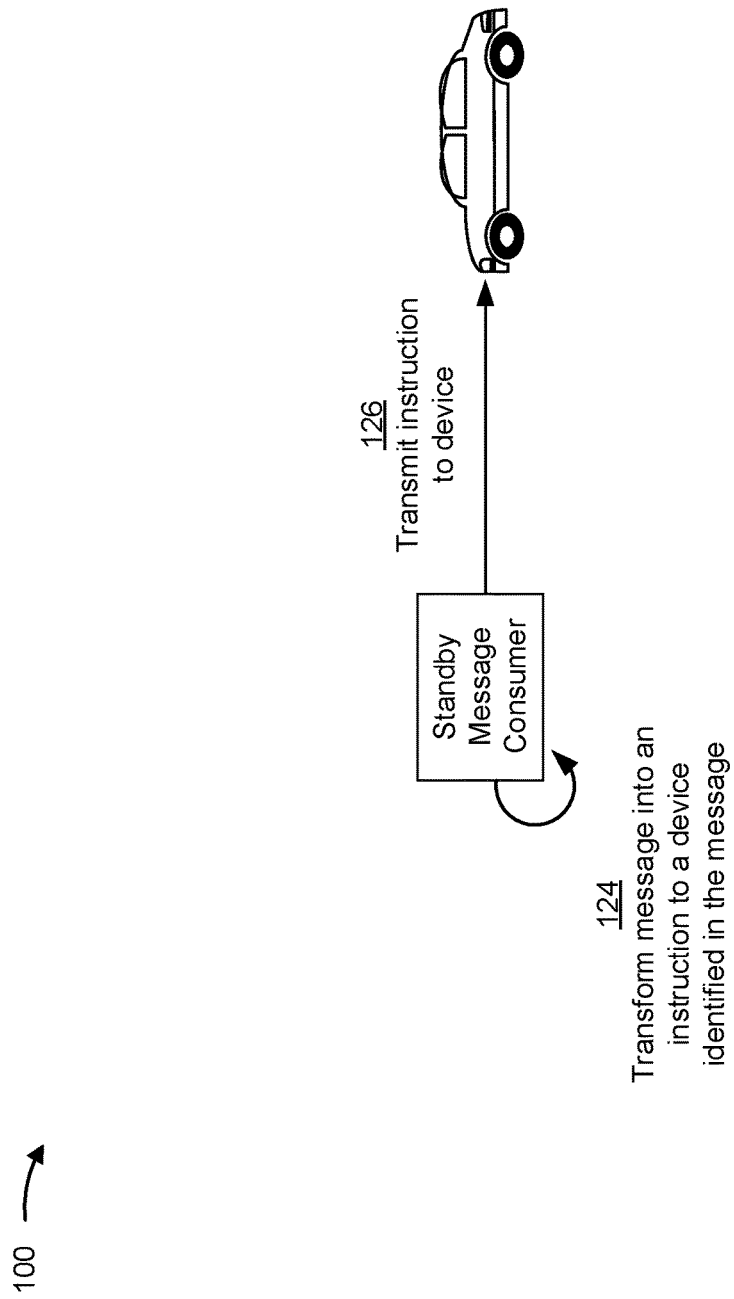

As shown in FIG. 1E, and by reference number 124, the standby message consumer can transform a message obtained from the standby message queue into an instruction for a device. For example, the content of the message (e.g., an identifier of a particular telematics device and/or a type of action) can be extracted from the message and formed into an instruction for a telematics device or another device. In some implementations, the instruction can relate to an action that is to be executed by the telematics device (e.g., the instruction can relate to starting an engine of a vehicle associated with the telematics device). In some implementations, the instruction can relate to an action that is to be executed by a device associated with the messaging system (e.g., the instruction can relate to transmitting an alert to an emergency dispatcher, transmitting an alert to a customer support center, creating an incident record, and/or the like). In some implementations, the instruction can relate to an action that is to be executed by a user device (e.g., the instruction can relate to displaying a speeding notification on the user device).

As shown by reference number 126, the standby message consumer can transmit, or cause to be transmitted, the instruction to a device (e.g., a telematics device identified in the message to which the instruction relates). In some implementations, the device can be a telematics device integrated with a vehicle. For example, the telematics device can be integrated with one or more systems of a vehicle, such as an engine control unit of the vehicle, an on-board computer of the vehicle, and/or one or more electronic systems of the vehicle.

In some implementations, the telematics device of the vehicle, or another device, can process the instruction received from the standby message consumer and execute the action indicated in the instruction. For example, the telematics device can determine one or more operations based on the instruction and communicate the one or more operations to one or more systems of the vehicle that will perform the action instructed by the standby message consumer.

As indicated above, FIGS. 1A-1E are provided merely as examples. Other examples can differ from what was described with regard to FIGS. 1A-1E.

Figure 2:
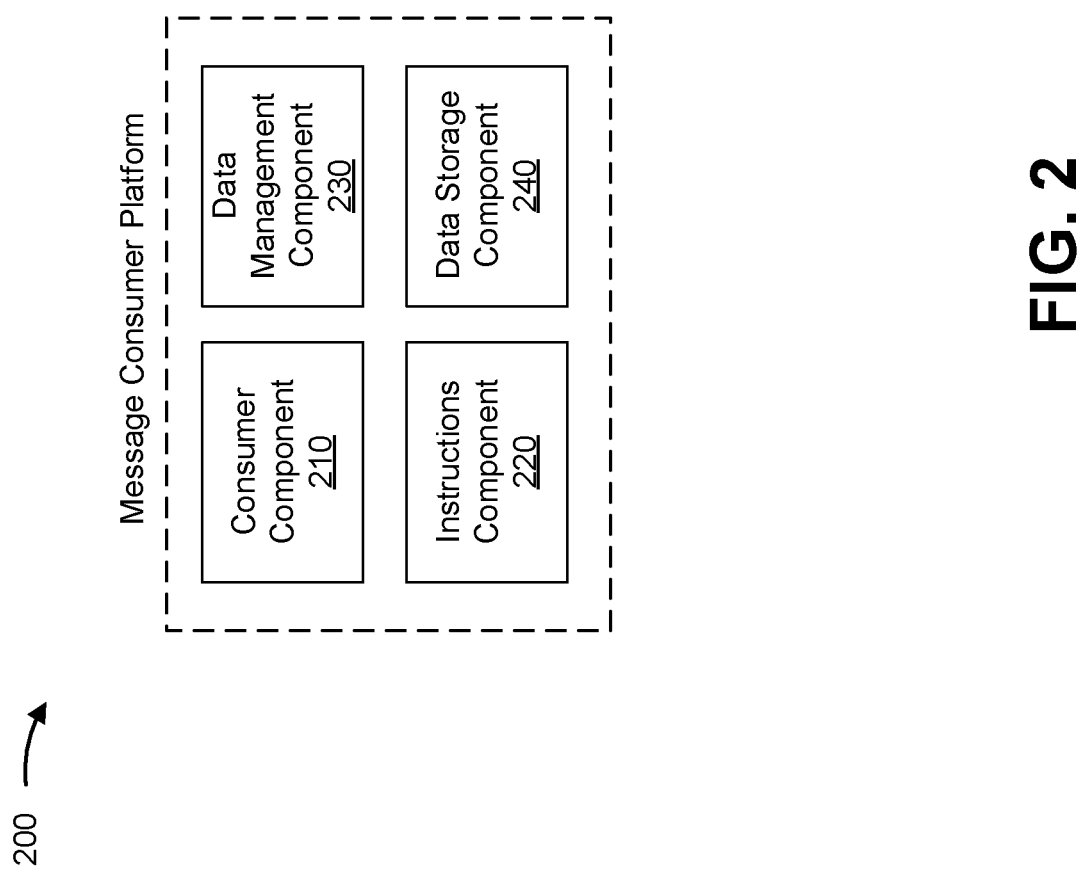
FIG. 2 is a diagram of an example implementation described herein.

FIG. 2 is a diagram of an example implementation 200 described herein. FIG. 2 shows example components of a message consumer platform. The message consumer platform can obtain a message from a message queue associated with a messaging system, transform the message into an instruction for a device, such as a telematics device, and transmit the instruction to the device. In some implementations, the primary message consumer and/or standby message consumer, described above, can be a message consumer platform or a component of a message consumer platform.

As shown in FIG. 2, the message consumer platform can include a consumer component 210. For example, consumer component 210 can obtain messages from messaging system devices, as described herein. As further shown in FIG. 2, the message consumer platform can include an instructions component 220. For example, instructions component 220 can transform a message into an instruction to a device, such as a telematics device, and transmit the instruction to the device. As further shown in FIG. 2, the message consumer platform can include a data management component 230. For example, the message consumer platform can use data management component 230 to receive, store, process, modify, access, and/or the like data, as described herein. As further shown in FIG. 2, the message consumer platform can include a data storage component 240. For example, data storage component 240 can include a data structure used to store data, results of analyses, and/or the like.

As indicated above, FIG. 2 is provided merely as an example. Other examples can differ from what was described with regard to FIG. 2. The number and arrangement of components shown in FIG. 2 are provided as an example. In practice, the message consumer platform can include additional components, fewer components, different components, or differently arranged components than those shown in FIG. 2. Additionally, or alternatively, a set of components (e.g., one or more components) of the message consumer platform can perform one or more functions described as being performed by another set of components of the message consumer platform.

Figure 3:
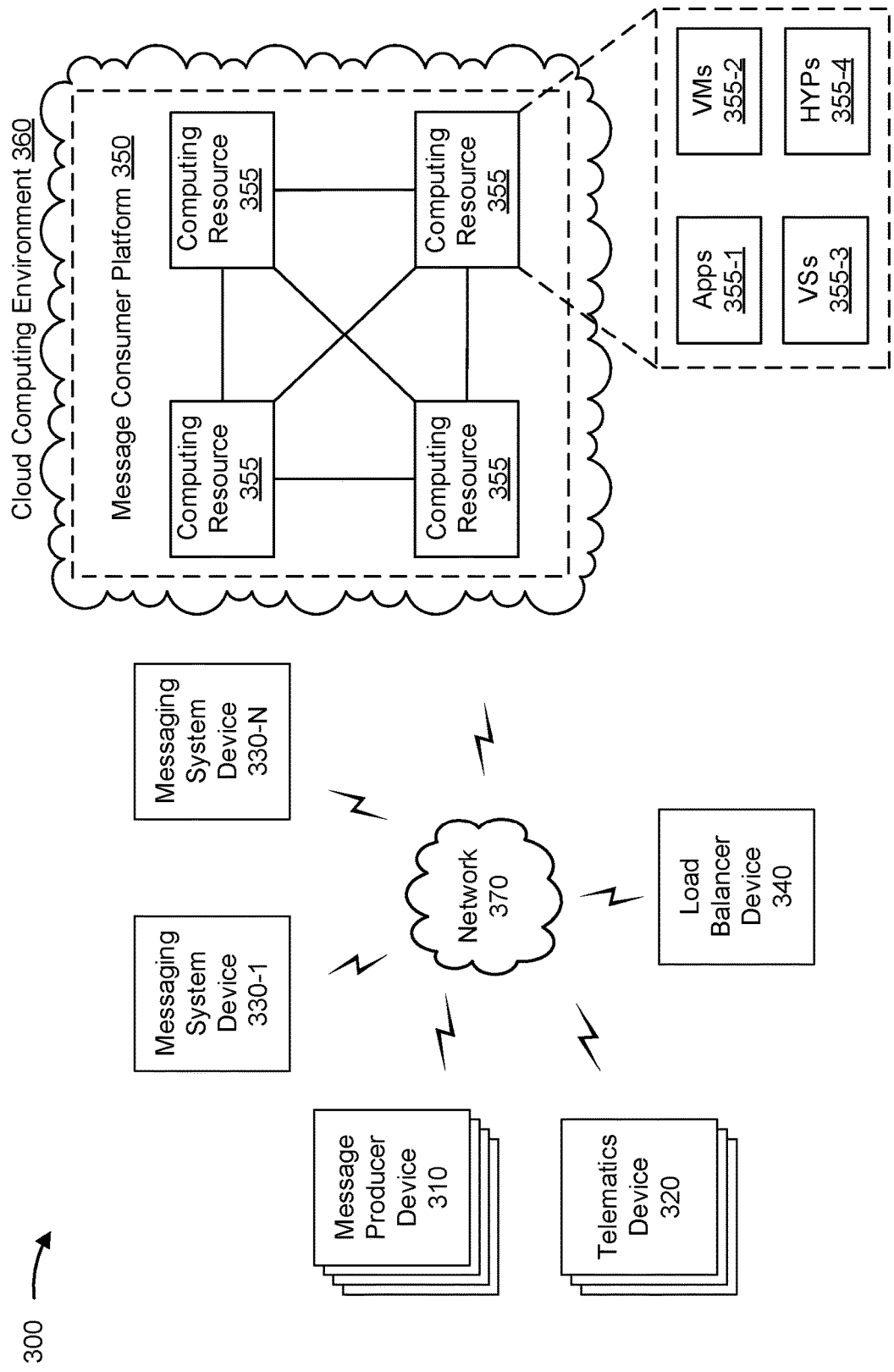
FIG. 3 is a diagram of an example environment in which systems and/or methods described herein can be implemented.

FIG. 3 is a diagram of an example environment 300 in which systems and/or methods, described herein, can be implemented. As shown in FIG. 3, environment 300 can include a message producer device 310, a telematics device 320, one or more messaging system devices 330-1 through 330-N (N>1) (hereinafter referred to collectively as "messaging system devices 330," and individually as "messaging system device 330"), a load balancer device 340, a message consumer platform 350, a computing resource 355, a cloud computing environment 360, and a network 370. Devices of environment 300 can interconnect via wired connections, wireless connections, or a combination of wired and wireless connections.

Message producer device 310 includes one or more devices (e.g., electronic devices) capable of transmitting (e.g., via wireless, such as cellular, communication) messages (e.g., a request for action) to a messaging system (e.g., that brokers messages between message producer devices and message consumer platforms). For example, message producer device 310 can include a mobile phone (e.g., a smartphone), a computing device (e.g., a server device associated with a telematics service provider), and/or the like.

Telematics device 320 includes one or more devices (e.g., electronic devices) capable of wireless communication (e.g., cellular communication), such as a telecommunication device. For example, telematics device 320 can include a computing device associated with a global positioning system (GPS), modem, and/or radio transceiver (e.g., a smartphone, a tablet computer, a handheld computer, a radiotelephone, an on-board diagnostics device, an original equipment manufacturer (OEM) device, an electronic control module (ECM) device, etc.), or similar device capable of performing telematics functions. In some implementations, telematics device 320 can be associated with a vehicle. In some implementations, telematics device 320 can be associated with a house, a building, and/or the like. Telematics device 320 can receive instructions to execute an action (e.g., an action requested by the message producer).

Messaging system devices 330 include one or more server devices and/or server device clusters responsible for a messaging system (i.e., a message queue). For example, messaging system devices 330 can receive incoming messages from a message producer and enqueue the messages for retrieval by a message consumer.

Load balancer device 340 includes one or more devices (e.g., a load balancer) capable of distributing incoming messages among the messaging system devices 330. For example, load balancer device 340 can include a computing device (e.g., a server computer) capable of performing load balancing functions.

Message consumer platform 350 includes one or more computing resources assigned to process messages from a message queue of a message system and to process messaging system failover. For example, message consumer platform 350 can obtain messages from a message queue of a messaging system, transform the messages into instructions for devices, such as telematics devices, and transmit the instructions to the devices.

Message consumer platform 350 can include one or more server devices. In some implementations, message consumer platform 350 is implemented by computing resources 355 of cloud computing environment 360. Notably, while implementations described herein describe message consumer platform 350 as being hosted in cloud computing environment 360, in some implementations, message consumer platform 350 might not be cloud-based or can be partially cloud-based.

Cloud computing environment 360 includes an environment that delivers computing as a service, whereby shared resources, services, etc. can be provided to message producer device 310, telematics device 320, messaging system devices 330, load balancer device 340, and/or the like. Cloud computing environment 360 can provide computation, software, data access, storage, and/or other services that do not require end-user knowledge of a physical location and configuration of a system and/or a device that delivers the services. As shown, cloud computing environment 360 can include message consumer platform 350 and computing resource 355. In some implementations, cloud computing environment 360 can include a messaging system resource, a load balancer resource, and/or a message producer resource.

Computing resource 355 includes one or more personal computers, workstation computers, server devices, or another type of computation and/or communication device. In some implementations, computing resource 355 can host message consumer platform 350. The cloud resources can include compute instances executing in computing resource 355, storage devices provided in computing resource 355, data transfer devices provided by computing resource 355, etc. In some implementations, computing resource 355 can communicate with other computing resources 355 via wired connections, wireless connections, or a combination of wired and wireless connections.

As further shown in FIG. 3, computing resource 355 can include a group of cloud resources, such as one or more applications ("APPs") 355-1, one or more virtual machines ("VMs") 355-2, virtualized storage ("VSs") 355-3, one or more hypervisors ("HYPs") 355-4, or the like.

Application 355-1 includes one or more software applications. For example, application 355-1 can include software associated with message consumer platform 350 and/or any other software capable of being provided via cloud computing environment 360. In some implementations, one application 355-1 can send/receive information to/from one or more other applications 355-1, via virtual machine 355-2.

Virtual machine 355-2 includes a software implementation of a machine (e.g., a computer) that executes programs like a physical machine. Virtual machine 355-2 can be either a system virtual machine or a process virtual machine, depending upon use and degree of correspondence to any real machine by virtual machine 355-2. A system virtual machine can provide a complete system platform that supports execution of a complete operating system ("OS"). A process virtual machine can execute a single program and can support a single process. In some implementations, virtual machine 355-2 can execute on behalf of a user, and can manage infrastructure of cloud computing environment 360, such as data management, synchronization, or long-duration data transfers.

Virtualized storage 355-3 includes one or more storage systems and/or one or more devices that use virtualization techniques within the storage systems or devices of computing resource 355. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 355-4 provides hardware virtualization techniques that allow multiple operating systems (e.g., "guest operating systems") to execute concurrently on a host computer, such as computing resource 355. Hypervisor 355-4 can present a virtual operating platform to the guest operating systems and can manage the execution of the guest operating systems. Multiple instances of a variety of operating systems can share virtualized hardware resources.

Network 370 includes one or more wired and/or wireless networks. For example, network 370 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as an example. In practice, there can be additional devices and/or networks, fewer devices and/or networks, different devices and/or networks, or differently arranged devices and/or networks than those shown in FIG. 3. Furthermore, two or more devices shown in FIG. 3 can be implemented within a single device, or a single device shown in FIG. 3 can be implemented as multiple, distributed devices. Additionally, or alternatively, a set of devices (e.g., one or more devices) of environment 300 can perform one or more functions described as being performed by another set of devices of environment 300.

Figure 4:
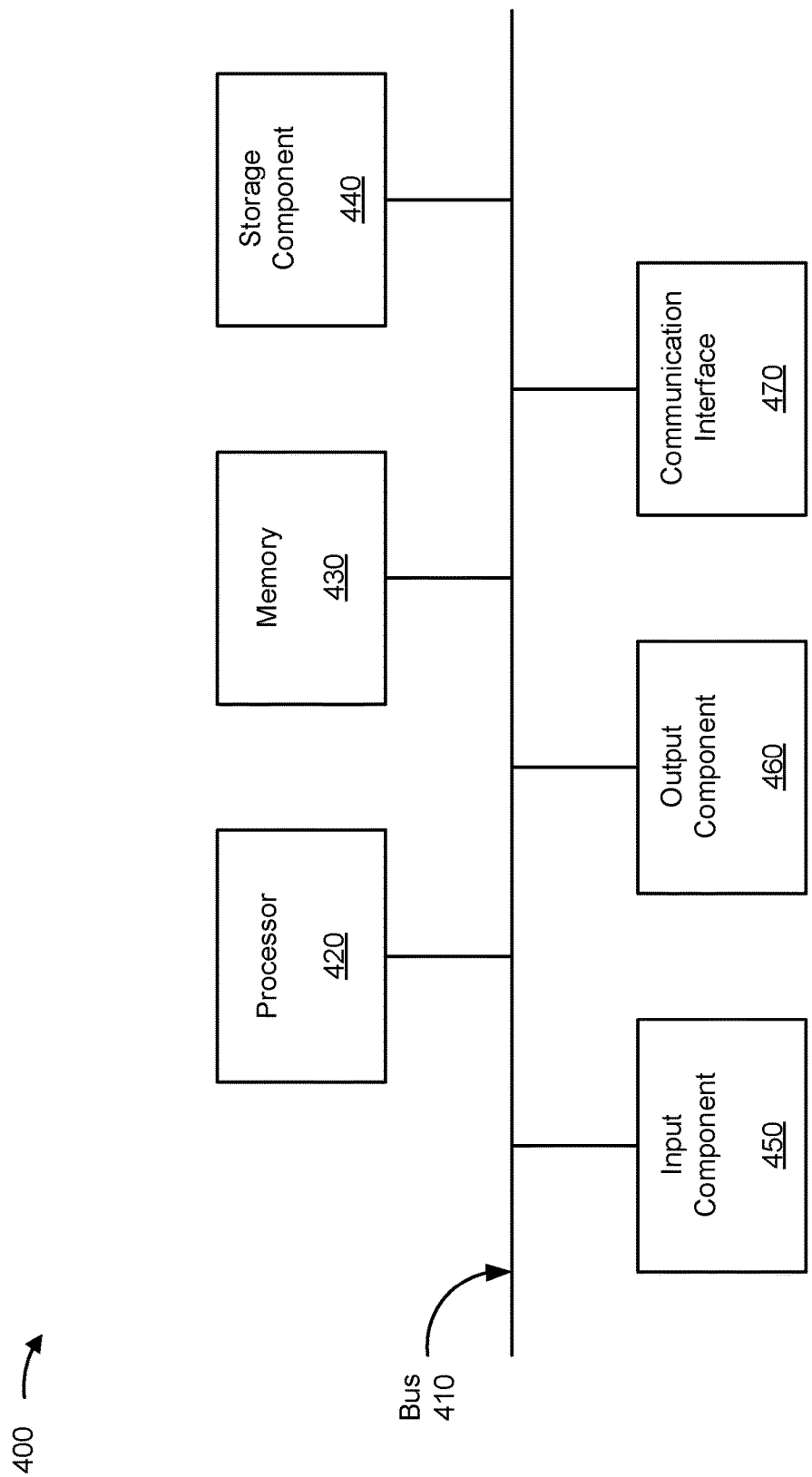
FIG. 4 is a diagram of example components of one or more devices of FIG. 3.

FIG. 4 is a diagram of example components of a device 400. Device 400 can correspond to message producer device 310, telematics device 320, messaging system devices 330, load balancer device 340, message consumer platform 350, and/or computing resource 355. In some implementations message producer device 310, telematics device 320, messaging system devices 330, load balancer device 340, message consumer platform 350, and/or computing resource 355 can include one or more devices 400 and/or one or more components of device 400. As shown in FIG. 4, device 400 can include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 can include a sensor for sensing information (e.g., GPS component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 can permit device 400 to receive information from another device and/or provide information to another device. For example, communication interface 470 can include an Ethernet interface, an optical interface, a coaxial interface, an infrared interface, a radio frequency (RF) interface, a universal serial bus (USB) interface, a wireless local area network interface, a cellular network interface, or the like.

Device 400 can perform one or more processes described herein. Device 400 can perform these processes based on processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions can be read into memory 430 and/or storage component 440 from another computer-readable medium or from another device via communication interface 470. When executed, software instructions stored in memory 430 and/or storage component 440 can cause processor 420 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 can include additional components, fewer components, different components, or differently arranged components than those shown in FIG. 4. Additionally, or alternatively, a set of components (e.g., one or more components) of device 400 can perform one or more functions described as being performed by another set of components of device 400.

FIG. 5 is a flow chart of an example process 500 for messaging system failover. In some implementations, one or more process blocks of FIG. 5 can be performed by a message consumer platform (e.g., message consumer platform 350). In some implementations, one or more process blocks of FIG. 5 can be performed by another device or a group of devices separate from or including the message consumer platform, such as a message producer device (e.g., message producer device 310), a telematics device (e.g., telematics device 320), a messaging system device (e.g., messaging system device 330), and/or a load balancer device (e.g., load balancer device 340).

As shown in FIG. 5, process 500 can include receiving a notification indicating a failure of one or more first server devices, wherein the one or more first server devices are responsible for a primary message queue, wherein the primary message queue includes a plurality of messages at a time of the failure of the one or more first server devices, wherein a message time is assigned to each of the plurality of messages, wherein the primary message queue is associated with a standby message queue, wherein the plurality of messages is replicated to the standby message queue, wherein one or more second server devices are responsible for the standby message queue, and wherein a position in the standby message queue is assigned to each of the plurality of messages replicated to the standby message queue (block 510). For example, the message consumer platform (e.g., using consumer component 210, instruction component 220, data management component 230, data storage component 240, computing resource 355, processor 420, memory 430, storage component 440, input component 450, communication interface 470, and/or the like) can receive a notification indicating a failure of one or more first server devices, as described above. In some implementations, the one or more first server devices can be responsible for a primary message queue, the primary message queue can include a plurality of messages at a time of the failure of the one or more first server devices, the primary message queue can be associated with a standby message queue, and the plurality of messages can be replicated to the standby message queue. In some implementations, one or more second server devices can be responsible for the standby message queue, a message time can be assigned to each of the plurality of messages, and a position in the standby message queue can be assigned to each of the plurality of messages replicated to the standby message queue.

As further shown in FIG. 5, process 500 can include obtaining, from a data structure, a record time, wherein the record time identifies the message time of one of the plurality of messages that was last obtained from the primary message queue prior to the failure of the one or more first server devices (block 520). For example, the message consumer platform (e.g., using consumer component 210, instruction component 220, data management component 230, data storage component 240, computing resource 355, processor 420, memory 430, storage component 440, communication interface 470, and/or the like) can obtain, from a data structure, a record time, as described above. In some implementations, the record time can identify the message time of one of the plurality of messages that was last obtained from the primary message queue prior to the failure of the one or more first server devices.

As further shown in FIG. 5, process 500 can include performing a time adjustment of the record time to obtain an adjusted record time (block 530). For example, the message consumer platform (e.g., using consumer component 210, instruction component 220, data management component 230, data storage component 240, computing resource 355, processor 420, memory 430, storage component 440, and/or the like) can perform a time adjustment of the record time to obtain an adjusted record time, as described above.

As further shown in FIG. 5, process 500 can include comparing the adjusted record time and the message time of one or more of the plurality of messages of the standby message queue (block 540). For example, the message consumer platform (e.g., using consumer component 210, instruction component 220, data management component 230, data storage component 240, computing resource 355, processor 420, memory 430, storage component 440, and/or the like) can compare the adjusted record time and the message time of one or more of the plurality of messages of the standby message queue, as described above.

As further shown in FIG. 5, process 500 can include determining a starting position in the standby message queue based on comparing the adjusted record time and the message time of one or more of the plurality of messages (block 550). For example, the message consumer platform (e.g., using consumer component 210, instruction component 220, data management component 230, data storage component 240, computing resource 355, processor 420, memory 430, storage component 440, communication interface 470, and/ or the like) can determine a starting position in the standby message queue based on comparing the adjusted record time and the message time of one or more of the plurality of messages, as described above.

As further shown in FIG. 5, process 500 can include obtaining one or more of the plurality of messages from the standby message queue beginning at one of the plurality of messages assigned to the position that matches the starting position (block 560). For example, the message consumer platform (e.g., using consumer component 210, instruction component 220, data management component 230, data storage component 240, computing resource 355, processor 420, memory 430, storage component 440, communication interface 470, and/or the like) can obtain one or more of the plurality of messages from the standby message queue beginning at one of the plurality of messages assigned to the position that matches the starting position, as described above.

As further shown in FIG. 5, process 500 can include processing the one or more of the plurality of messages obtained from the standby message queue (block 570). For example, the message consumer platform (e.g., using consumer component 210, instruction component 220, data management component 230, data storage component 240, computing resource 355, processor 420, memory 430, storage component 440, input component 450, output component 460, communication interface 470, and/or the like) can process the one or more of the plurality of messages obtained from the standby message queue, as described above.

Process 500 can include additional implementations, such as any single implementation or any combination of implementations described below and/or in connection with one or more other processes described elsewhere herein.

In some implementations, the time adjustment of the record time can be a decrease based on the plurality of messages each relating to an action of a type that is to be executed exactly once, and, when processing the one or more of the plurality of messages obtained from the standby message queue, the message consumer platform can generate a standby message identifier, where the standby message identifier is associated with a message of the one or more of the plurality of messages obtained from the standby message queue. Additionally, when processing the one or more of the plurality of messages obtained from the standby message queue, the message consumer platform can compare the standby message identifier and one or more of a plurality of primary message identifiers to determine whether there is a match of the standby message identifier and a primary message identifier of the plurality of primary message identifiers, where each primary message identifier, of the plurality of primary message identifiers, is associated with a respective one of the plurality of messages of the primary message queue obtained prior to the failure of the one or more first server devices. Additionally, when processing the one or more of the plurality of messages obtained from the standby message queue, the message consumer platform can generate an instruction to a device according to the message based on determining that there is no match, and can transmit the instruction to cause the device to execute the action.

In some implementations, the standby message identifier can be generated by hashing one or more first data associated with the message, and each primary message identifier can be a hash value of one or more second data associated with one of the plurality of messages of the primary message queue.

In some implementations, the time adjustment of the record time can be an increase based on the plurality of messages relating to an action of a type that is to be executed no more than once, where processing the one or more of the plurality of messages obtained from the standby message queue can include generating an instruction to a device according to a message of the one or more of the plurality of messages, and transmitting the instruction to cause the device to execute the action.

In some implementations, the time adjustment of the record time can be a decrease based on the plurality of messages each relating to an action of a type that is to be executed one or more times, where processing the one or more of the plurality of messages obtained from the standby message queue can include generating an instruction to a device according to a message of the one or more of the plurality of messages, and transmitting the instruction to cause the device to execute the action.

In some implementations, when performing the time adjustment of the record time, the message consumer platform can perform the time adjustment of the record time based on historical lag time data, where the historical lag time data includes data associated with a time difference between message insertion into the primary message queue and message retrieval from the primary message queue prior to the failure of the one or more first server devices.

In some implementations, the one or more first server devices can be associated with a first geographical region and the one or more second server devices can be associated with a second geographical region, where the first geographical region is different from the second geographical region.

Although FIG. 5 shows example blocks of process 500, in some implementations, process 500 can include additional blocks, fewer blocks, different blocks, or differently arranged blocks than those depicted in FIG. 5. Additionally, or alternatively, two or more of the blocks of process 500 can be performed in parallel.

The foregoing disclosure provides illustration and description, but is not intended to be exhaustive or to limit the implementations to the precise form disclosed. Modifications and variations can be made in light of the above disclosure or can be acquired from practice of the implementations.

As used herein, the term "component" is intended to be broadly construed as hardware, firmware, or a combination of hardware and software.

Certain user interfaces have been described herein and/or shown in the figures. A user interface can include a graphical user interface, a non-graphical user interface, a text-based user interface, or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, and/or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving a notification indicating a failure of one or more first server devices,
      wherein the one or more first server devices are responsible for a primary message queue,
         wherein the primary message queue includes a plurality of messages at a time of the failure of the one or more first server devices,
         wherein a message time is assigned to each of the plurality of messages,
      wherein the primary message queue is associated with a standby message queue,
         wherein the plurality of messages is replicated to the standby message queue,
         wherein one or more second server devices are responsible for the standby message queue, and
         wherein a position in the standby message queue is assigned to each of the plurality of messages replicated to the standby message queue;
   obtaining, from a data structure, a record time,
      wherein the record time identifies the message time of one of the plurality of messages that was last obtained from the primary message queue prior to the failure of the one or more first server devices;
   performing, based on calculating an average lag time from historical lag time data recorded prior to the failure of the one or more first server devices, a time adjustment of the record time to obtain an adjusted record time,
      wherein the time adjustment of the record time is one of:
         a decrease based on the plurality of messages each relating to an action of a type that is to be executed exactly once,
         an increase based on the plurality of messages each relating to an action of a type that is to be executed no more than once, or
         a decrease based on the plurality of messages each relating to an action of a type that is to be executed one or more times;
   comparing the adjusted record time and the message time of one or more of the plurality of messages of the standby message queue;
   determining a starting position in the standby message queue based on comparing the adjusted record time and the message time of one or more of the plurality of messages;
   obtaining one or more of the plurality of messages from the standby message queue beginning at one of the plurality of messages assigned to the position that matches the starting position; and
   processing the one or more of the plurality of messages obtained from the standby message queue.

2. The method of claim 1, wherein the time adjustment of the record time is a decrease based on the plurality of messages each relating to an action of a type that is to be executed exactly once, and
   wherein processing the one or more of the plurality of messages obtained from the standby message queue comprises:
      generating a standby message identifier,
         wherein the standby message identifier is associated with a message of the one or more of the plurality of messages obtained from the standby message queue;
      comparing the standby message identifier and one or more of a plurality of primary message identifiers to determine whether there is a match of the standby message identifier and a primary message identifier of the plurality of primary message identifiers,
         wherein each primary message identifier, of the plurality of primary message identifiers, is associated with a respective one of the plurality of messages of the primary message queue obtained prior to the failure of the one or more first server devices;

generating an instruction to a device according to the message based on determining that there is no match; and transmitting the instruction to cause the device to execute the action.

3. The method of claim 2, wherein the standby message identifier is generated by hashing one or more first data associated with the message, and each primary message identifier is a hash value of one or more second data associated with one of the plurality of messages of the primary message queue.

4. The method of claim 1, wherein the time adjustment of the record time is an increase based on the plurality of messages relating to an action of a type that is to be executed no more than once, and wherein processing the one or more of the plurality of messages obtained from the standby message queue comprises:

generating an instruction to a device according to a message of the one or more of the plurality of messages; and transmitting the instruction to cause the device to execute the action.

5. The method of claim 1, wherein the time adjustment of the record time is a decrease based on the plurality of messages each relating to an action of a type that is to be executed one or more times, and wherein processing the one or more of the plurality of messages obtained from the standby message queue comprises:

generating an instruction to a device according to a message of the one or more of the plurality of messages; and transmitting the instruction to cause the device to execute the action.

6. The method of claim 1, wherein performing the time adjustment of the record time comprises:

performing the time adjustment of the record time based on historical lag time data, wherein the historical lag time data includes data associated with a time difference between message insertion into the primary message queue and message retrieval from the primary message queue prior to the failure of the one or more first server devices.

7. The method of claim 1, wherein the one or more first server devices are associated with a first geographical region and the one or more second server devices are associated with a second geographical region, and wherein the first geographical region is different from the second geographical region.

8. A non-transitory computer-readable medium storing one or more instructions, the one or more instructions comprising:

one or more instructions that, when executed by one or more processors, cause the one or more processors to:

receive a notification indicating a failure of one or more first server devices, wherein the one or more first server devices are responsible for a primary message queue, wherein the primary message queue includes a plurality of messages at a time of the failure of the one or more first server devices, wherein a message time is assigned to each of the plurality of messages, wherein the primary message queue is associated with a standby message queue, wherein the plurality of messages is replicated to the standby message queue, wherein one or more second server devices are responsible for the standby message queue, and wherein a position in the standby message queue is assigned to each of the plurality of messages replicated to the standby message queue;

obtain, from a data structure, a record time, wherein the record time identifies the message time of one of the plurality of messages that was last obtained from the primary message queue prior to the failure of the one or more first server devices;

perform, based on calculating an average lag time from historical lag time data recorded prior to the failure of the one or more first server devices, a time adjustment of the record time to obtain an adjusted record time, wherein the time adjustment of the record time is one of:

a decrease based on the plurality of messages each relating to an action of a type that is to be executed exactly once, an increase based on the plurality of messages each relating to an action of a type that is to be executed no more than once, or a decrease based on the plurality of messages each relating to an action of a type that is to be executed one or more times;

compare the adjusted record time and the message time of one or more of the plurality of messages of the standby message queue;

determine a starting position in the standby message queue based on comparing the adjusted record time and the message time of one or more of the plurality of messages;

obtain one or more of the plurality of messages from the standby message queue beginning at one of the plurality of messages assigned to the position that matches the starting position; and process the one or more of the plurality of messages obtained from the standby message queue.

9. The non-transitory computer-readable medium of claim 8, wherein the time adjustment of the record time is a decrease based on the plurality of messages each relating to an action of a type that is to be executed exactly once, and wherein the one or more instructions, that cause the one or more processors to process the one or more of the plurality of messages obtained from the standby message queue, cause the one or more processors to:

generate a standby message identifier, wherein the standby message identifier is associated with a message of the one or more of the plurality of messages obtained from the standby message queue;

compare the standby message identifier and one or more of a plurality of primary message identifiers to determine whether there is a match of the standby message identifier and a primary message identifier of the plurality of primary message identifiers, wherein each primary message identifier, of the plurality of primary message identifiers, is associated with a respective one of the plurality of messages of the primary message queue obtained prior to the failure of the one or more first server devices;

generate an instruction to a device according to the message based on determining that there is no match; and transmit the instruction to cause the device to execute the action.

10. The non-transitory computer-readable medium of claim 9, wherein the standby message identifier is generated by hashing one or more first data associated with the message, and each primary message identifier is a hash value of one or more second data associated with one of the plurality of messages of the primary message queue.

11. The non-transitory computer-readable medium of claim 8, wherein the time adjustment of the record time is an increase based on the plurality of messages relating to an action of a type that is to be executed no more than once, and
wherein the one or more instructions, that cause the one or more processors to process the one or more of the plurality of messages obtained from the standby message queue, cause the one or more processors to:
generate an instruction to a device according to a message of the one or more of the plurality of messages; and
transmit the instruction to cause the device to execute the action.

12. The non-transitory computer-readable medium of claim 8, wherein the time adjustment of the record time is a decrease based on the plurality of messages each relating to an action of a type that is to be executed one or more times, and
wherein the one or more instructions, that cause the one or more processors to process the one or more of the plurality of messages obtained from the standby message queue, cause the one or more processors to:
generate an instruction to a device of the one or more of the plurality of messages; and
transmit the instruction to cause the device to execute the action.

13. The non-transitory computer-readable medium of claim 8, wherein the one or more first server devices are associated with a first geographical region and the one or more second server devices are associated with a second geographical region,
wherein the first geographical region is different from the second geographical region.

14. A device, comprising:
one or more memories; and
one or more processors, communicatively coupled to the one or more memories, configured to:
receive a notification indicating a failure of one or more first server devices,
wherein the one or more first server devices are responsible for a primary message queue,
wherein the primary message queue includes a plurality of messages at a time of the failure of the one or more first server devices,
wherein a message time is assigned to each of the plurality of messages,
wherein the primary message queue is associated with a standby message queue,
wherein the plurality of messages is replicated to the standby message queue,
wherein one or more second server devices are responsible for the standby message queue, and
wherein a position in the standby message queue is assigned to each of the plurality of messages replicated to the standby message queue;
obtain, from a data structure, a record time,
wherein the record time identifies the message time of one of the plurality of messages that was last obtained from the primary message queue prior to the failure of the one or more first server devices;
perform, based on calculating an average lag time from historical lag time data recorded prior to the failure of the one or more first server devices, a time adjustment of the record time to obtain an adjusted record time,
wherein the time adjustment of the record time is one of:
a decrease based on the plurality of messages each relating to an action of a type that is to be executed exactly once,
an increase based on the plurality of messages each relating to an action of a type that is to be executed no more than once, or
a decrease based on the plurality of messages each relating to an action of a type that is to be executed one or more times;
compare the adjusted record time and the message time of one or more of the plurality of messages of the standby message queue;
determine a starting position in the standby message queue based on comparing the adjusted record time and the message time of one or more of the plurality of messages;
obtain one or more of the plurality of messages from the standby message queue beginning at one of the plurality of messages assigned to the position that matches the starting position; and
process the one or more of the plurality of messages obtained from the standby message queue.

15. The device of claim 14, wherein the time adjustment of the record time is a decrease based on the plurality of messages each relating to an action of a type that is to be executed exactly once, and
wherein the one or more processors, when processing the one or more of the plurality of messages obtained from the standby message queue, are configured to:
generate a standby message identifier,
wherein the standby message identifier is associated with a message of the one or more of the plurality of messages obtained from the standby message queue;
compare the standby message identifier and one or more of a plurality of primary message identifiers to determine whether there is a match of the standby message identifier and a primary message identifier of the plurality of primary message identifiers,
wherein each primary message identifier, of the plurality of primary message identifiers, is associated with a respective one of the plurality of messages of the primary message queue obtained prior to the failure of the one or more first server devices;
generate an instruction to another device according to the message based on determining that there is no match; and
transmit the instruction to cause the other device to execute the action.

16. The device of claim 15, wherein the standby message identifier is generated by hashing one or more first data associated with the message, and each primary message identifier is a hash value of one or more second data associated with one of the plurality of messages of the primary message queue.

17. The device of claim 14, wherein the time adjustment of the record time is an increase based on the plurality of messages relating to an action of a type that is to be executed no more than once, and
    wherein the one or more processors, when processing the one or more of the plurality of messages obtained from the standby message queue, are configured to:
        generate an instruction to another device according to a message of the one or more of the plurality of messages; and
        transmit the instruction to cause the other device to execute the action.

18. The device of claim 14, wherein the time adjustment of the record time is a decrease based on the plurality of messages each relating to an action of a type that is to be executed one or more times, and
    wherein the one or more processors, when processing the one or more of the plurality of messages obtained from the standby message queue, are configured to:
        generate an instruction to another device according to a message of the one or more of the plurality of messages; and
        transmit the instruction to cause the other device to execute the action.

19. The method of claim 1, further comprising:
    extracting content of the one or more of the plurality of messages obtained from the standby message queue; and
    transforming the extracted content into instructions for a device, wherein the device includes at least one of:
        a telematics device,
        a device associated with a messaging system, or
        a user device.

20. The non-transitory computer-readable medium of claim 8, wherein the one or more instructions that, when executed by the one or more processors, further cause the one or more processors to:
    extract content of the one or more of the plurality of messages obtained from the standby message queue; and
    transform the extracted content into instructions for at least one of:
        a telematics device,
        a device associated with a messaging system, or
        a user device.

\* \* \* \* \*